US012638179B1

(12) United States Patent
Chere et al.

(10) Patent No.: US 12,638,179 B1
(45) Date of Patent: May 26, 2026

(54) ENGINE TORSIONAL FRAME FOR EXHAUST CHANNEL TRACK SELECTION

(71) Applicant: RTX CORPORATION, Farmington, CT (US)

(72) Inventors: Gregory M. Chere, Glastonbury, CT (US); Simon W. Evans, Farmington, CT (US)

(73) Assignee: RTX CORPORATION, Farmington, CT (US)

(*) Notice: Subject to any disclaimer, the term of this patent is extended or adjusted under 35 U.S.C. 154(b) by 0 days.

(21) Appl. No.: 19/047,919

(22) Filed: Feb. 7, 2025

(51) Int. Cl.
*F23R 3/00* (2006.01)
*F01D 15/10* (2006.01)
*F23R 3/36* (2006.01)

(52) U.S. Cl.
CPC .............. *F23R 3/005* (2013.01); *F01D 15/10* (2013.01); *F23R 3/36* (2013.01); *F05D 2220/323* (2013.01); *F05D 2220/76* (2013.01)

(58) Field of Classification Search
CPC .. F23R 3/005; F23R 3/36; F01D 15/10; F05D 2220/323; F05D 2220/76; F02C 1/04; F02C 7/224; F28F 2250/06; F28F 13/06
See application file for complete search history.

(56) References Cited

U.S. PATENT DOCUMENTS

| | | | | |
|---|---|---|---|---|
| 8,961,114 | B2 | 2/2015 | Ruthemeyer | |
| 10,760,493 | B2 | 9/2020 | Thomas | |
| 11,939,924 | B2 | 3/2024 | Kantany et al. | |
| 2024/0011417 | A1* | 1/2024 | Sibbach | F01D 21/12 |
| 2024/0035757 | A1* | 2/2024 | Wickham | F28F 9/0268 |

* cited by examiner

*Primary Examiner* — Steven M Sutherland
(74) *Attorney, Agent, or Firm* — Carlson, Gaskey & Olds, P.C.

(57) ABSTRACT

An aircraft propulsion system includes a core engine and a heat exchanger assembly that is operable in a heat exchanger configuration where the exhaust gas flow is in thermal communication with a working fluid flow and a bypass configuration where the exhaust gas flow passes through the heat exchanger assembly without thermal communication with the working fluid flow.

20 Claims, 7 Drawing Sheets

ENGINE TORSIONAL FRAME FOR EXHAUST CHANNEL TRACK SELECTION

TECHNICAL FIELD

The present disclosure relates a multi-fuel aircraft propulsion system including a bottoming cycle utilizing a cryogenic fuel for cooling at select operating conditions.

BACKGROUND

Reduction and/or elimination of carbon emissions generated by aircraft operation is a desire of aircraft manufacturers and airline operators. Turbine engines compress incoming core airflow, mix the compressed airflow with fuel that is ignited in a combustor to generate a high energy exhaust gas flow. Alternate fuels can provide reductions in carbon emissions and may be used in combination with other fuel types. Each fuel type may provide unique performance advantages that may be captured utilizing different engine flow path configurations.

Turbine engine manufacturers continue to seek further improvements to engine performance including improvements to thermal, transfer and propulsive efficiencies.

SUMMARY

An aircraft propulsion system according to an exemplary embodiment of this disclosure, among other possible things includes a core engine that has a main compressor where an inlet airflow is compressed and communicated to a combustor to generate an exhaust gas flow that is expanded through a main turbine section to generate power used to drive the main compressor and a propulsive fan, a fuel system that is configured to provide at least two fuel types to the combustor for generating the exhaust gas flow, a heat exchanger assembly that is operable in a heat exchanger configuration where the exhaust gas flow is in thermal communication with a working fluid flow and a bypass configuration where the exhaust gas flow passes through the heat exchanger assembly without thermal communication with the working fluid flow, and a controller that is programmed to operate the heat exchanger assembly to switch between the heat exchanger configuration and the bypass configuration in response to which of the at least two fuel types the fuel system is providing to the combustor.

In a further embodiment of the foregoing aircraft propulsion systems, the heat exchanger assembly includes a plurality of heat exchanger segments that are separated by a corresponding plurality of bypass passages.

In a further embodiment of any of the foregoing aircraft propulsion systems, the heat exchanger assembly further includes a flow diverter movable to block exhaust gas flow through the plurality of bypass passages in the heat exchanger configuration and to block exhaust gas flow through the plurality of heat exchanger segments when in the bypass configuration.

In a further embodiment of any of the foregoing aircraft propulsion systems, the heat exchanger assembly is annular about an engine longitudinal axis and the flow diverter is rotated circumferentially between the heat exchanger configuration and the bypass configuration.

In a further embodiment of any of the foregoing, the aircraft propulsion system further includes an actuator for rotating the flow diverter. The controller is further programmed to operate the actuator to move the heat exchanger between the heat exchanger configuration and the bypass configuration.

In a further embodiment of any of the foregoing aircraft propulsion systems, the heat exchanger assembly is disposed within an exhaust gas flow path aft of at least one portion of the main turbine section.

In a further embodiment of any of the foregoing aircraft propulsion systems, the heat exchanger assembly further includes a mixer assembly movable to define an exit flow through the heat exchanger assembly. The mixer assembly is movable between a first position that corresponds with the heat exchanger configuration and a second position that corresponds with the bypass configuration.

In a further embodiment of any of the foregoing aircraft propulsion systems, the mixer assembly includes a plurality of flaps movable to define an aft flow surface of the heat exchanger assembly in each of the heat exchanger configuration and the bypass configuration.

In a further embodiment of any of the foregoing, the aircraft propulsion system further includes a bottoming cycle where the working fluid flow is heated by the exhaust gas flow in the heat exchanger assembly and expanded through a bottoming turbine to generate shaft power.

In a further embodiment of any of the foregoing aircraft propulsion systems, the at least two fuel types include a cryogenic fuel and the bottoming cycle includes a fuel/working fluid heat exchanger where heat from the working fluid is communicated into a flow of the cryogenic fuel.

In a further embodiment of any of the foregoing aircraft propulsion systems, the at least two fuel types include a hydrocarbon based fuel and a cryogenic fuel and the controller is programmed to operate the heat exchanger in the bypass configuration when the hydrocarbon fuel is utilized and to operate the heat exchanger in the heat exchange configuration when the cryogenic fuel is utilized.

In a further embodiment of any of the foregoing aircraft propulsion systems, the at least two fuel types include a hydrocarbon fuel and a cryogenic fuel and the controller is further programmed to operate the fuel system to provide a select one of the hydrocarbon fuel and the cryogenic fuel based on a predefined flight profile.

A bottoming cycle system for an aircraft propulsion system according to another exemplary embodiment of this disclosure, among other possible things includes a heat exchanger assembly operable in a heat exchanger configuration where an exhaust gas flow is in thermal communication with a working fluid flow and a bypass configuration where the exhaust gas flow passes through the heat exchanger assembly without thermal communication, a bottoming turbine where the heated working fluid flow from the heat exchanger assembly expands to generate shaft power, a fuel/working fluid heat exchanger where heat from the working fluid flow is communicated to a cryogenic fuel flow, and a controller programmed to operate the heat exchanger assembly to switch between the heat exchanger configuration and the bypass configuration in response to the cryogenic fuel flow being communicated through the fuel/working fluid heat exchanger.

In a further embodiment of the foregoing bottoming cycle systems, the heat exchanger assembly is annular and includes a plurality of annular heat exchanger segments separated by a corresponding plurality of annular bypass passages and a flow diverter movable to block exhaust gas flow through the plurality of annular bypass passages in the heat exchanger configuration and to block exhaust gas flow through the plurality of annular heat exchanger segments when in the bypass configuration.

In a further embodiment of any of the foregoing bottoming cycle systems, the heat exchanger assembly further includes a mixer assembly movable to define an exit flow through the heat exchanger assembly. The mixer assembly is movable between a first position that corresponds with the heat exchanger configuration and a second position that corresponds with the bypass configuration.

In a further embodiment of any of the foregoing bottoming cycle systems, the mixer assembly includes a plurality of flaps movable to define an aft flow surface of the heat exchanger assembly in each of the heat exchanger configuration and the bypass configuration.

In a further embodiment of any of the foregoing, the bottoming cycle system further includes a bottoming compressor where the working fluid flow is pressurized and a generator is driven by the bottoming turbine.

A method of operating an aircraft propulsion system according to another exemplary embodiment of this disclosure, among other possible things includes communicating a fuel flow that includes one of a hydrocarbon based fuel and a cryogenic fuel to a combustor in response to a predefined flight profile, generating an exhaust gas flow within the combustor of a core engine by igniting a mixture of the fuel flow and an inlet airflow within a combustor, generating power by expanding the exhaust gas flow through a main turbine section to drive a compressor section and a propulsive fan, operating a heat exchanger assembly in a heat exchanger configuration where the exhaust gas flow is in thermal communication with a working fluid flow in response to a cryogenic fuel being used to generate the exhaust gas flow, and operating the heat exchanger assembly in a bypass configuration where the exhaust gas flow passes through the heat exchanger assembly without thermal communication with the working fluid flow in response to a hydrocarbon fuel being used to generate the exhaust gas flow.

In a further embodiment of the foregoing, the method further includes heating a working fluid flow with the exhaust gas flow with the heat exchanger assembly in the heat exchanger configuration and expanding the working fluid through a bottoming turbine to generate shaft power.

In a further embodiment of any of the foregoing, the method further includes passing the exhaust gas flow through a plurality of bypass passages when the heat exchange assembly is in the bypass configuration.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
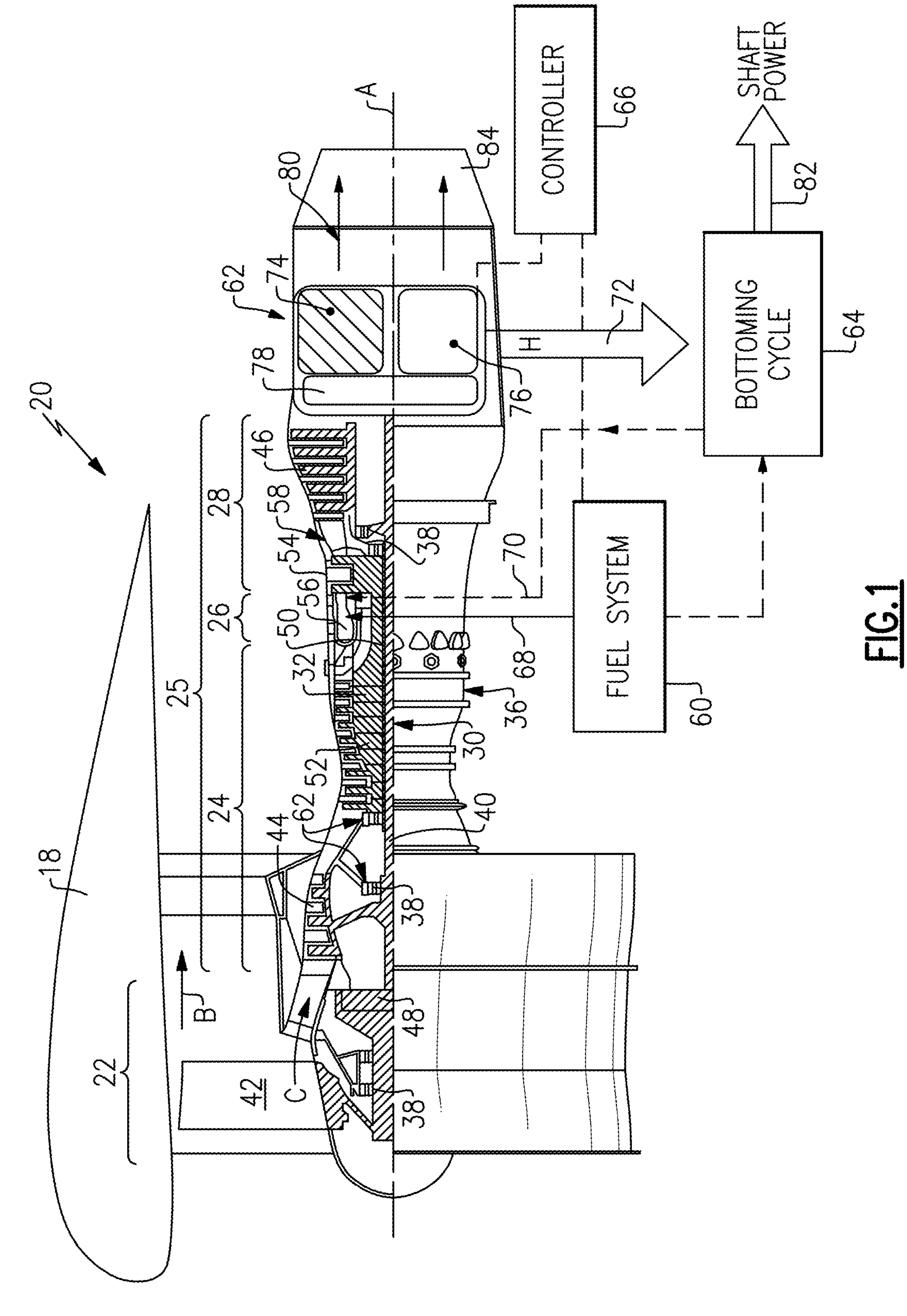
FIG. 1 is a schematic view of an example aircraft propulsion system.

FIG. 1 schematically illustrates an aircraft propulsion system 20 that includes a multi-fuel fuel system 60, a bottoming cycle system 64 and a heat exchanger assembly 62. The heat exchanger assembly 62 provides different flow paths for an exhaust gas flow 80 based on the type of fuel currently being utilized and operation of the bottoming cycle system 64.

The heat exchanger assembly 62 is operable between a heat exchanging configuration where an exhaust gas flow 80 is communicated through heat exchanger portions 74 and a bypass configuration where the exhaust gas flow is communicated through bypass passages 76. The example fuel system 60 provides one of a first fuel flow 68 or a second fuel flow 70 to a core engine 25 to generate the exhaust gas flow 80. In one example embodiment, the first fuel flow 68 is a hydrocarbon based fuel and the second fuel flow 70 is a cryogenic fuel that is used in the bottoming cycle system 64.

During operation with the first fuel flow 68, the exhaust gas flow 80 is bypassed around the heat exchanger portions 74. During operation with the cryogenic second fuel flow 70, the exhaust gas flow 80 is communicated through the heat exchanger portions 74 to communicate heat 72 into the bottoming cycle system 64 to generate shaft power 82.

The propulsion system 20 includes a core engine 25 that is disclosed by way of example as a two-spool turbofan that generally incorporates a fan section 22, a compressor section 24, a combustor section 26 and a turbine section 28. The fan section 22 may include a single-stage having a plurality of fan blades 42. The fan blades 42 may have a fixed stagger angle or may have a variable pitch to direct incoming airflow from an engine inlet. The fan section 22 drives air along a bypass flow path B in a bypass duct defined within nacelle 18, and also drives air along a core flow path C for compression and communication into the combustor section 26 then expansion through the turbine section 28.

Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary core engine 25 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan section 22 through a speed change mechanism, which in the exemplary core engine 25 is illustrated as a geared architecture 48 to drive the fan section 22 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan section 22 and low pressure compressor 44 through the geared architecture 48 such that the fan section 22 and low pressure compressor 44 are rotatable at a common speed. Although this application discloses geared architecture 48, its teaching may benefit direct drive engines having no geared architecture.

The high speed spool 32 includes an outer shaft 50 that interconnects a second (or high) pressure compressor 52 and a second (or high) pressure turbine 54. A combustor 56 is arranged in the exemplary core engine 25 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core engine 25 may be a high-bypass geared aircraft engine. It should be understood that the teachings disclosed herein may be utilized with various engine architectures, such as low-bypass turbofan engines, prop fan and/or open rotor engines, turboprops, turbojets, etc.

The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan section 22.

Figure 2:
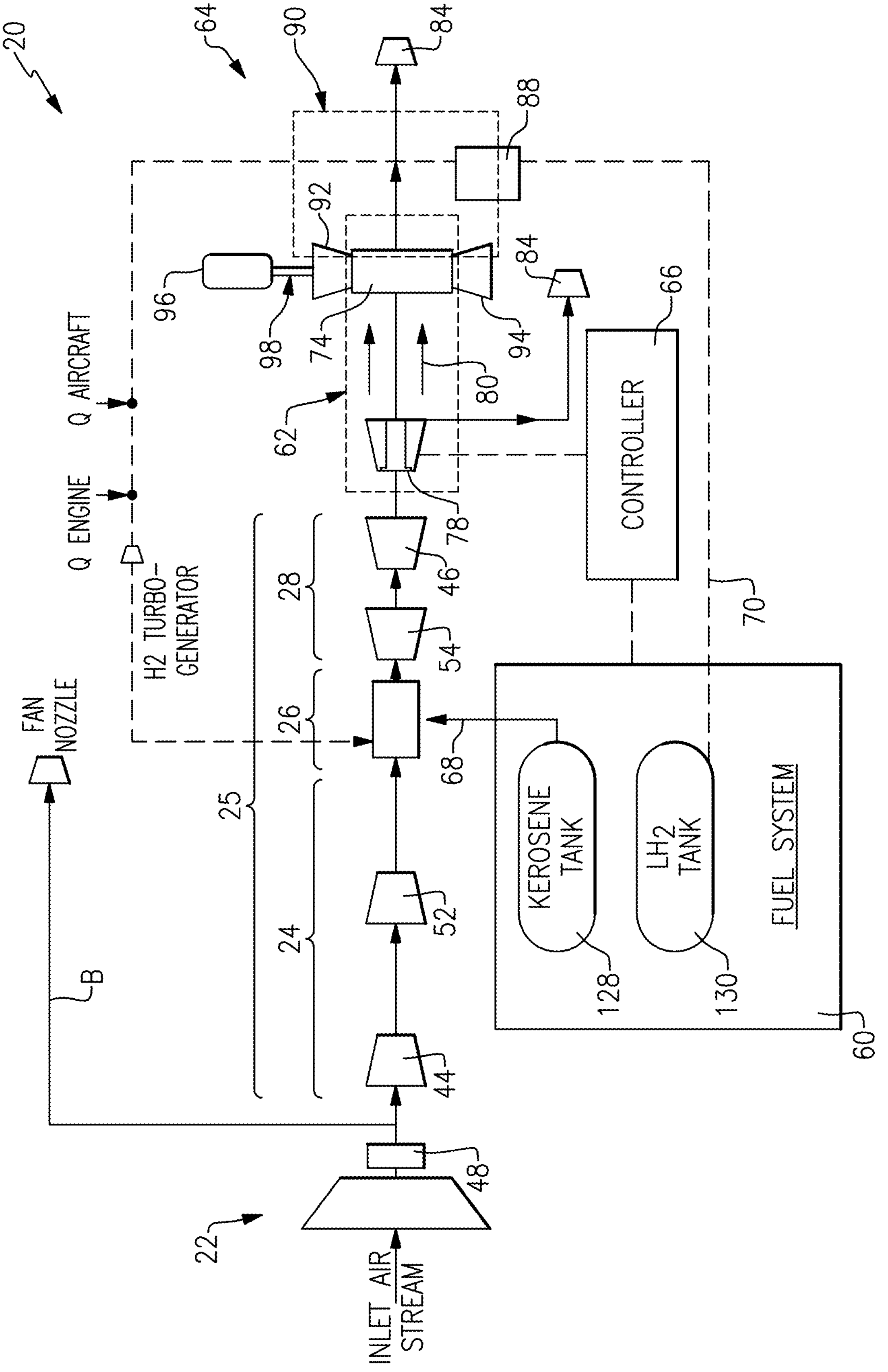
FIG. 2 is another schematic view of the example aircraft propulsion system and bottoming cycle system.

Referring to FIG. 2, with continued reference to FIG. 1, the example fuel system 60 provides at least two fuel types to the core engine 25. In one example embodiment, the fuel system 60 includes a first fuel tank 128 for a hydrocarbon based fuel that provides the first fuel flow 68. The fuel system 60 further includes a second fuel tank 130 for a cryogenic fuel that provides the second fuel flow 70. The fuel system 60 is configured to switch between the first fuel flow 68 and the second fuel flow 70 to improve engine efficiency. The fuel system 60 further includes any required pumps, valving, and conduits for supplying and switching between fuels.

In one example embodiment, the first fuel flow 68 is a carbon based fuel such as for example kerosene. In one example embodiment, the second cryogenic fuel flow 70 is a hydrogen-based fuel. The hydrogen-based fuel may be hydrogen and/or be derived from hydrogen containing compounds such as ammonia. In another example embodiment, the cryogenic fuel is a liquid natural gas. It should be appreciated that although hydrogen, ammonia and liquid natural gas are disclosed by way of example, other cryogenic fuels could be utilized and are within the scope and contemplation of this disclosure. The second fuel tank 130 includes features for maintaining the cryogenic fuel flow 70 at temperatures required to maintain the fuel in a liquid form.

The fuel system 60 is operable to provide one of the first fuel flow 68 and the second fuel flow 70 based on an engine operating conditions, and or a predefined operating profile. A controller 66 is utilized to control operation of the fuel system 60 along with the heat exchanger assembly 62. The example controller 66 is a device and system programed to perform necessary computing or calculation operations for operation of the fuel system 60 and heat exchanger assembly 62. The controller 66 may be specially constructed for operation of the fuel system 60 and heat exchanger assembly 62, or it may comprise at least a general-purpose computer selectively activated or reconfigured by software instructions stored in a memory device. The controller 66 may further be part of full authority digital engine control (FADEC) or an electronic engine controller (EEC).

The example bottoming cycle system 64 includes a working fluid 90 that absorbs heat from the exhaust gas flow 80 within the heat exchanger portions 74 of the heat exchanger assembly 62. The heated working fluid flow is expanded through a bottoming turbine 92 that drives a shaft 98 to generate shaft power. In one example embodiment, the shaft 98 is coupled to drive a generator 96 to produce electric power for use by the aircraft or core engine 25. Working fluid exhausted from the bottoming turbine 92 is cooled by the cryogenic second fuel flow 70 in a fuel/working fluid heat exchanger 88. The cooled working fluid is subsequently compressed in a bottoming compressor 94 before being heated again in the heat exchanger portion 74 and recirculated and expanded through the bottoming turbine 92.

Figure 3:
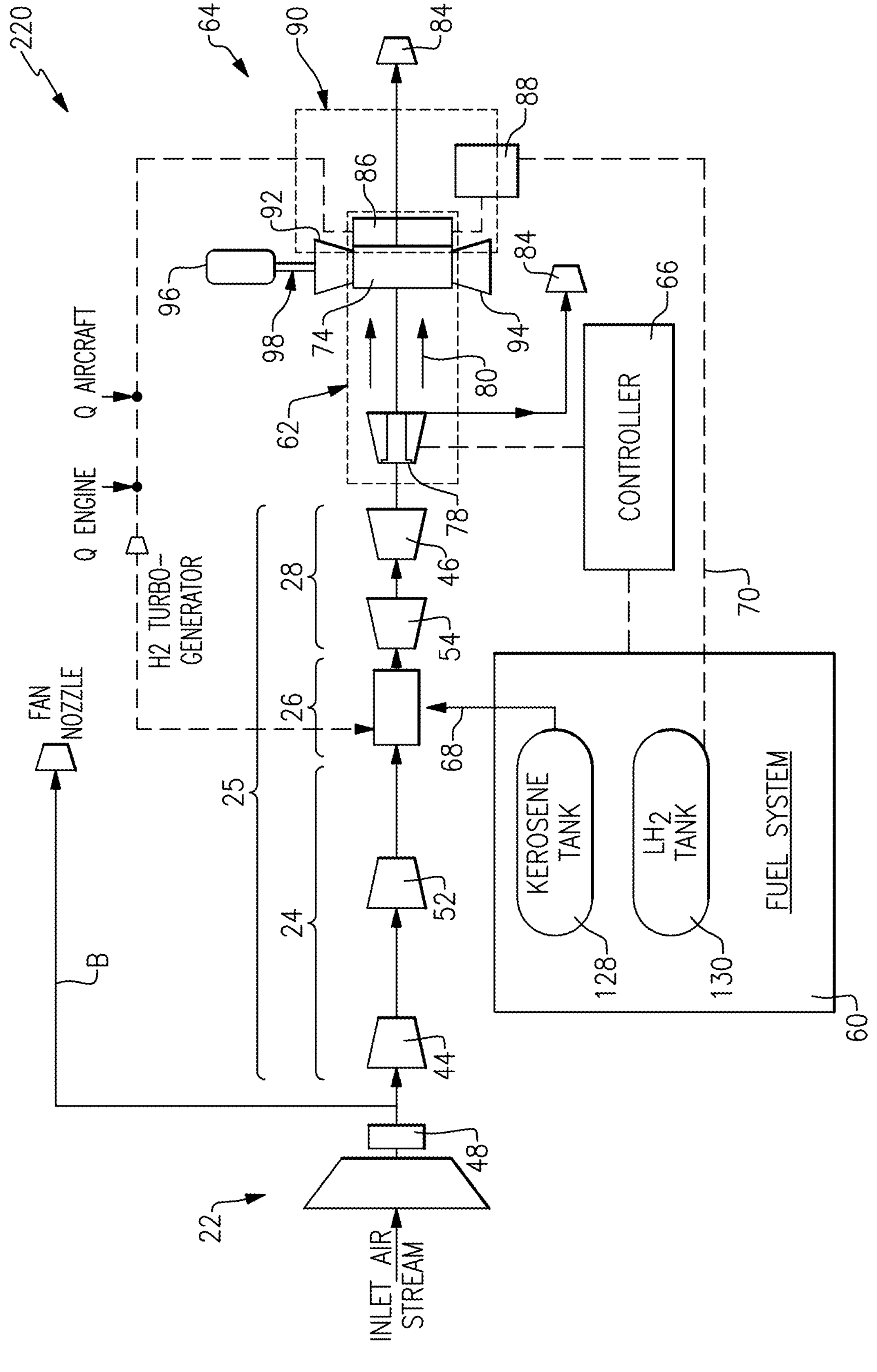
FIG. 3 is a schematic view of another example aircraft propulsion system and bottoming cycle system.

Referring to FIG. 3, in another example embodiment schematically shown at 220, the cryogenic second fuel flow 70 absorbs heat from the working fluid and is additionally heated in an exhaust heat exchanger 86 by the exhaust gas flow 80. Heating of the cryogenic second fuel flow 70 may substantially vaporize the fuel before being supplied to the combustor section 26 for burning. While heat from the exhaust gas flow 80 is used to heat and/or vaporize the second fuel flow 70 in the disclosed example embodiment, heat from other sources may also be utilized for vaporizing the fuel flow and are within the scope and contemplation of this disclosure. The low temperatures provided by the cryogenic second fuel flow 70 provide a temperature differential with the exhaust gas flow 80 that makes operation of the bottoming cycle system 64 sufficiently beneficial.

In contrast, the temperatures and heat absorptions capacity of the first fuel flow 68 may not provide sufficient benefit and therefore the bottoming cycle system 64 may be shut down. Restrictions to the exhaust gas flow 80 caused by flow through the heat exchange portions are therefore reduced by routing the exhaust gas flow through the bypass passages 76 (FIG. 1).

The example heat exchanger assembly 62 provides for dual operation to correspond with operation of use of the cryogenic second fuel flow 70 and the bottoming cycle system 64, and operation while using the first fuel flow 68, without the bottoming cycle system 64.

Figure 4:
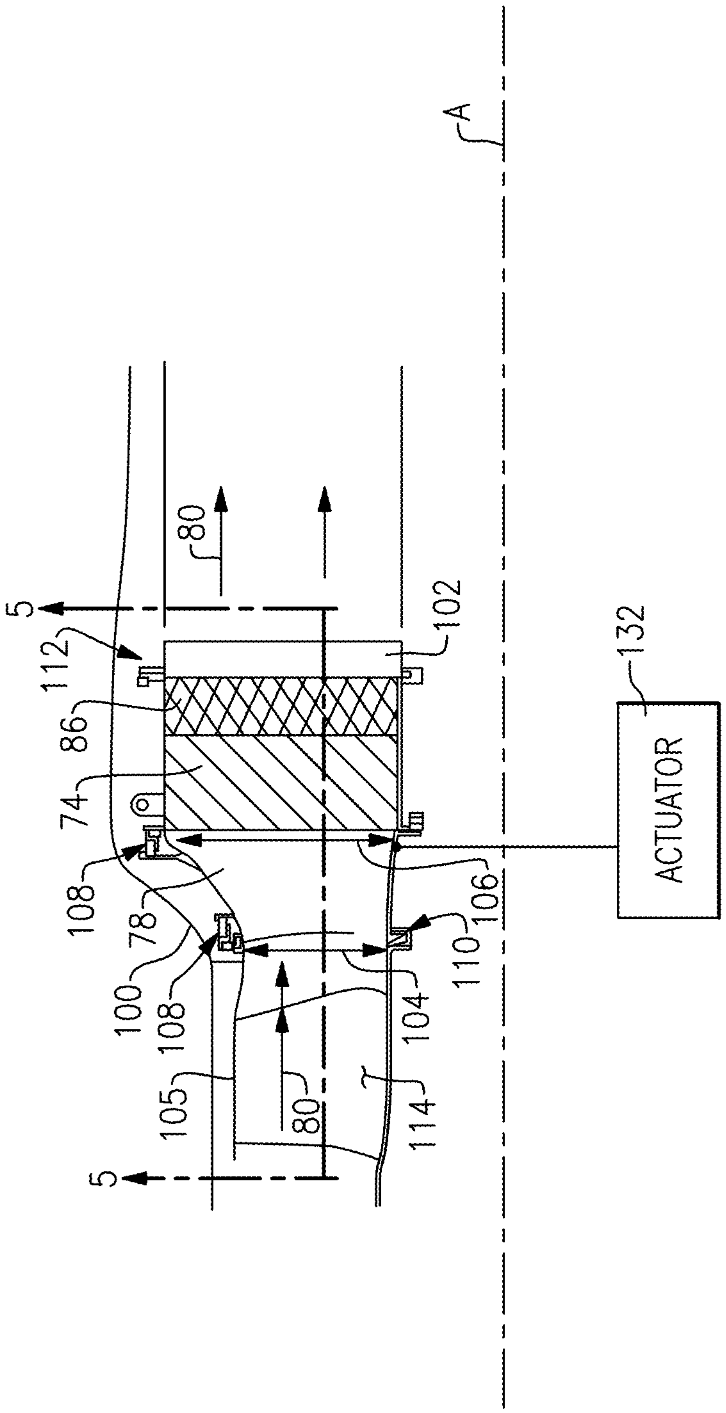
FIG. 4 is a cross-sectional view of an example heat exchanger assembly.
Figure 5:
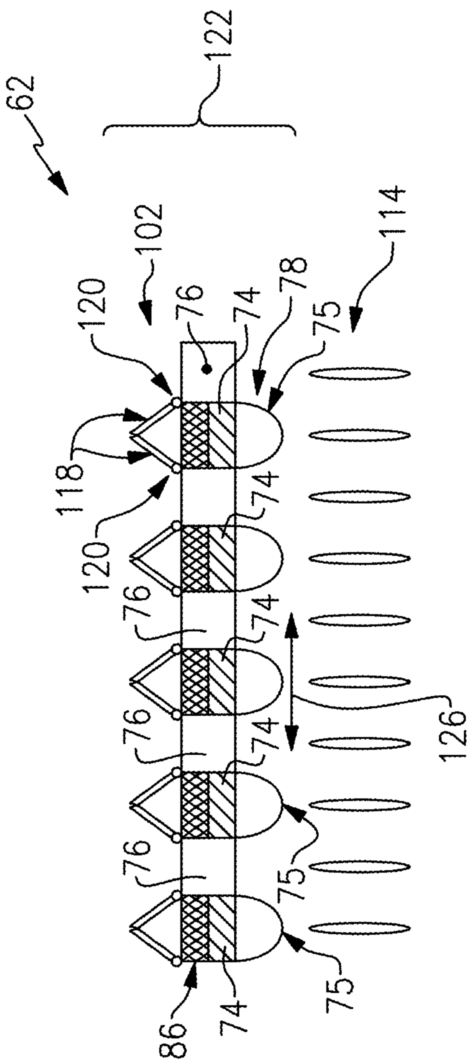
FIG. 5 is a schematic view of the example heat exchanger assembly in a bypass configuration.

Referring to FIGS. 4 and 5 with continued reference to FIG. 3, the heat exchanger assembly 62 includes a flow diverter 78 that is disposed forward of the heat exchanger portions 74. The exhaust gas heat exchanger 86 is disposed adjacent to the heat exchanger portions 74 and transfers heat into the second cryogenic fuel flow 70. The flow diverter 78 is operable to direct exhaust gas flow 80 into the heat exchanger portions 74 or through the bypass passages 76. The flow diverter 78 is aft of a plurality of turbine exhaust case struts 114. The flow diverter 78 is an annular structure that is rotatable about the engine axis A to direct the exhaust gas flow 80 through either the heat exchanger portions 74, the bypass passages 76, or a combination of the heat exchanger portions 74 and the bypass passages 76.

FIG. 5 illustrates the annular heat exchanger assembly 62 in a linear schematic view and shows the heat exchanger assembly 62 in the bypass configuration 122. In the bypass configuration 122 the flow diverter 78 is positioned in front of each of the plurality of heat exchanger portions 74 and the bypass passages 76 are open to the exhaust gas flow 80. The example flow diverter 78 comprises a plurality of diverter elements 75 that are spaced circumferentially apart and shaped to direct flow to either side. The example diverter elements 75 are symmetrical curved structures that are rotatable in a direction indicated by arrow 126 to selectively cover the heat exchanger portions 74 and the bypass passages 76.

The example flow diverter 78 is operated by an actuator assembly indicated schematically at 132 (FIG. 4). The actuator assembly 132 is operable to rotate the flow diverter 78 relative to the fixed heat exchanger portions 74 and bypass passages 76. The actuator assembly 132 may include mechanical linkage, sensors, and any other structures necessary for moving and positioning the diverter elements 75 relative to the heat exchanger portions 74. The actuator assembly 132 may include a rack and pinion gear set or other gear set or configuration. Upper seal assembly 108 and lower seal assembly 110 are provided between a static engine structure 100 and the moveable flow diverter 78. In one example embodiment, each of the seal assemblies 108, 110 may include a guide track for guiding movement of the flow diverter 78. In one example embodiment, the static engine structure 100 is attached to an aft portion of a turbine exhaust case (TEC) 105 and the seal assemblies 108, 110 include both guide structures and dry seals. Although dry seals are disclosed by way of example, other sealing configurations and assemblies could be utilized and are within the contemplation and scope of this disclosure.

The example flow diverter 78 expands radially in an axial direction toward the heat exchanger portions 74. An inlet radial length 104 is less than an outlet radial length 106 to provide an equivalent exhaust area as compared to an exhaust area that is not segmented annularly by the heat exchanger portions 74 and bypass passages 76. Division of the annular exhaust passage by the flow diverter 78 reduces the flow area for the exhaust gas flow 80. The increase in radial length at least partially compensates for the reduction in flow area to maintain desired flow characteristics of the exhaust gas flow 80.

A mixer assembly 102 is provided for conditioning the exhaust gas flow 80 aft of the heat exchanger assembly 62. The example mixer assembly 102 may be operated by sync ring 112 that is also operated by the actuator 132 to configure the mixer assembly 102 to correspond with the configuration of the flow diverter 78. The example mixer assembly 102 includes a plurality of flaps 118 that are pivotally mounted by hinges 120. The flaps 118 close over the aft side of the closed one of the heat exchanger portions 74 or the bypass passages 76. Closing off the aft side prevents back flow through the blocked portion and provides for remixing of the exhaust gas flow 80 prior to communication to the nozzle 84.

The example mixer assembly 102 includes the flaps 118 disposed between each of the heat exchanger portions 74 and the bypass passages 76. The flaps 118 are connected by hinges 120 and are actuated to contact an adjacent flap 118 as is schematically shown in FIG. 5. Although hinge mounted flaps 118 are shown and disclosed by way of example, other mixer configurations could be utilized and are within the contemplation of this disclosure.

Figure 8:
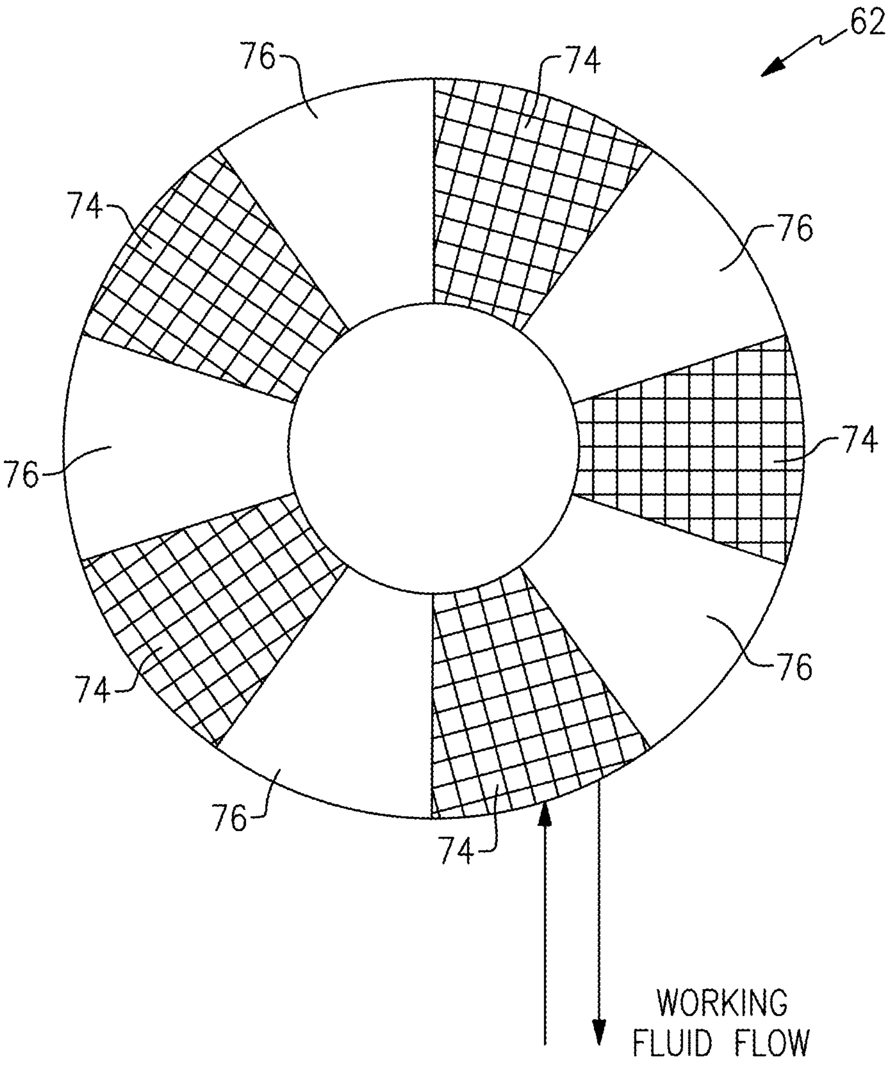
FIG. 8 is a cross-section axial view of the example heat exchanger assembly.

Referring to FIG. 8 with continued reference to FIG. 4, the example heat exchanger assembly 62 is annular and includes a plurality of heat exchanger portions 74 arranged between a plurality of bypass passages 76. Moreover, the exhaust gas heat exchanger 86 would include annular segments that match those of the heat exchanger portions 74. Each of the heat exchanger portions 74 and bypass passages 76 are annular segments of the annular flow path for the exhaust gas flow 80. Although the heat exchange portions 74 and bypass passages 76 are shown as having a substantially equal areas, different areas could be utilized and are within the scope of this disclosure.

Each of the example heat exchange portions 74 would be in fluid communication with the working fluid flow of the bottoming cycle 64 and each of heat exchanger 86 would be in fluid communication with the cryogenic fuel flow. Accordingly, required conduits for communicating working flow would be included as is schematically indicated.

Referring to FIGS. 3, 4, 5, and 6, in one example operational embodiment, the propulsion system 220 operates utilizing the first fuel flow 68 for generation of the exhaust gas flow 80. The controller 66 operates the actuator 132 to move the flow diverter 78 to place the diverter elements in the bypass configuration indicated at 122 in FIG. 5. In the bypass configuration, the exhaust gas flow 80 flows axially through the bypass passages 76 unimpeded by the heat exchanger portions 74. The mixer assembly 102 is arranged such that the flaps 118 close off an aft portion of a corresponding one of the heat exchanger portions 74. The working fluid flow from the bottoming cycle 64 may be closed off from circulation through the heat exchanger portions 74 by the controller 66. Accordingly, the bottoming cycle 64 is not operating and not generating shaft power.

During operation, the core engine 25 may be switched over to using the cryogenic second fuel flow 70 to generate the exhaust gas flow 80. The controller 66 may be programmed to perform the switch of fuels based on a predefined flight profile. The controller 66 may further be programmed to switch fuels based on other engine operating conditions that are designated to warrant operation with the cryogenic second fuel flow 70. Still further, the controller 66 may be programed to switch to the cryogenic fuel flow 70 in response to a prompt from a pilot.

Figure 6:
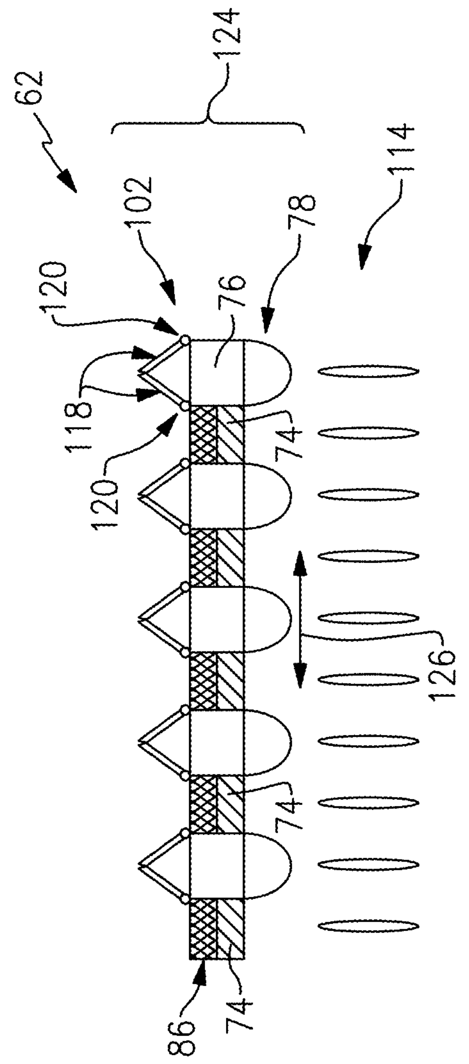
FIG. 6 is a schematic view of the example heat exchanger assembly in a heat exchanger configuration.

Upon switching to the cryogenic second fuel flow 70, the controller 66 prompts the actuator 132 to move the heat exchanger assembly 62 to the heat exchange configuration as schematically indicated at 124 in FIG. 6. In the heat exchanger configuration 124, the flow diverter 78 is shifted to block entrance to the bypass passages 76 and the mixer assembly 102 to block the outlet. The flaps 118 of the mixer assembly 118 are pivoted to contact an adjacent flap to block the aft opening of each of the bypass passages 76.

The exhaust gas flow 80 is then communicated through each of the heat exchanger portions 74 to communicate thermal energy into the working fluid flow 90 of the bottoming cycle 64. Additionally, the exhaust gas flow is communicated through portions of the exhaust gas heat exchanger 86 to heat the cryogenic fuel flow 70. The heated working fluid flow 90 is expanded through the bottoming turbine 92 to generate shaft power and, in this example embodiment, drive the generator 96. The heated working fluid flow 90 circulates through the fuel/working fluid heat exchanger 88 (FIG. 3) where it is cooled by the cryogenic second fuel flow 70. The working fluid flow 90 is subsequently circulated through the bottoming cycle 64 to recover thermal energy to produce electric power.

The cryogenic second fuel flow 70 picks up heat from the working fluid flow 90 and also from the exhaust gas flow 80 in the exhaust heat exchanger 86 before being communicated and burned in the combustor section 26.

Figure 7:
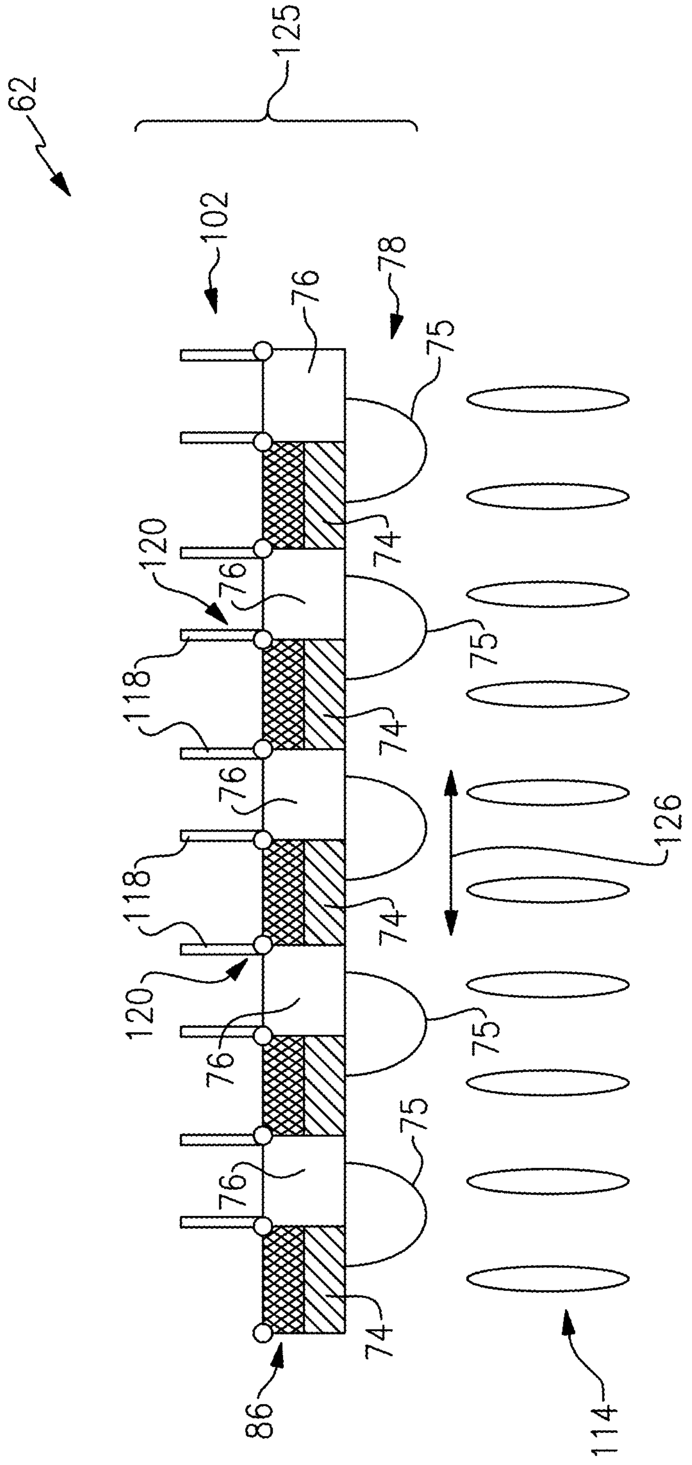
FIG. 7 is a schematic view of the example heat exchanger assembly in an intermediate configuration.

Referring to FIG. 7, to an intermediate configuration 125 where the diverter elements 75 partially block both the heat exchanger portions 74 and the bypass passages 76. In the intermediate configuration 125, the mixer assembly 102 is in an intermediate position where the flaps 118 are open to allow flow through both the heat exchanger portions 74 and the bypass passages 76. The intermediate configuration 125 may be a temporary position to provides for operation during transition between fuel types or other operating conditions where it is beneficial to allow exhaust gas flow through both the heat exchanger portions 74 and the bypass passages 76. It should be appreciated, that the intermediate position may include any position between the heat exchanger configuration 122 (FIG. 5) and the bypass configuration 124 (FIG. 6).

Switching back to operation with the first fuel flow 68 is provided by moving the flow diverter 78 back to block the heat exchanger portions 74 to the bypass configuration indicated at 122 and shown in FIG. 5. The controller 66 may be programmed to switch back and forth between configurations based on the type of fuel being used to generate the exhaust gas flow 80 to tailor operation of the propulsion system 20 to current operating and flight conditions.

Accordingly, the disclosed aircraft propulsion system 20 provides for the use of different fuels and includes a heat exchange assembly that is adaptable to selectively recover energy for operation of a bottoming cycle system 64 based on the type of fuel currently being utilized to generate the exhaust gas flow.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An aircraft propulsion system comprising:

a core engine comprising a main compressor where an inlet airflow is compressed and communicated to a combustor to generate an exhaust gas flow that is expanded through a main turbine section to generate power used to drive the main compressor and a propulsive fan;

a fuel system configured to provide at least two fuel types to the combustor for generating the exhaust gas flow;

a heat exchanger assembly operable in a heat exchanger configuration where the exhaust gas flow is in thermal communication with a working fluid flow and a bypass configuration where the exhaust gas flow passes through the heat exchanger assembly without thermal communication with the working fluid flow; and a controller programmed to operate the heat exchanger assembly to switch between the heat exchanger configuration and the bypass configuration in response to which of the at least two fuel types the fuel system is providing to the combustor.

2. The aircraft propulsion system as recited in claim 1, wherein the heat exchanger assembly includes a plurality of heat exchanger segments separated by a corresponding plurality of bypass passages.

3. The aircraft propulsion system as recited in claim 2, wherein the heat exchanger assembly further comprises a flow diverter movable to block exhaust gas flow through the plurality of bypass passages in the heat exchanger configuration and to block exhaust gas flow through the plurality of heat exchanger segments when in the bypass configuration.

4. The aircraft propulsion system as recited in claim 3, wherein the heat exchanger assembly is annular about an engine longitudinal axis and the flow diverter is rotated circumferentially between the heat exchanger configuration and the bypass configuration.

5. The aircraft propulsion system as recited in claim 4, further comprising an actuator for rotating the flow diverter, wherein the controller is further programmed to operate the actuator to move the heat exchanger between the heat exchanger configuration and the bypass configuration.

6. The aircraft propulsion system as recited in claim 4, wherein the heat exchanger assembly is disposed within an exhaust gas flow path aft of at least one portion of the main turbine section.

7. The aircraft propulsion system as recited in claim 4, wherein the heat exchanger assembly further comprises a mixer assembly movable to define an exit flow through the heat exchanger assembly, the mixer assembly movable between a first position that corresponds with the heat exchanger configuration and a second position that corresponds with the bypass configuration.

8. The aircraft propulsion system as recited in claim 7, wherein the mixer assembly comprises a plurality of flaps movable to define an aft flow surface of the heat exchanger assembly in each of the heat exchanger configuration and the bypass configuration.

9. The aircraft propulsion system as recited in claim 1, further comprising a bottoming cycle where the working fluid flow is heated by the exhaust gas flow in the heat exchanger assembly and expanded through a bottoming turbine to generate shaft power.

10. The aircraft propulsion system as recited in claim 9, wherein the at least two fuel types include a cryogenic fuel and the bottoming cycle includes a fuel/working fluid heat exchanger where heat from the working fluid is communicated into a flow of the cryogenic fuel.

11. The aircraft propulsion system as recited in claim 1, wherein the at least two fuel types include a hydrocarbon based fuel and a cryogenic fuel and the controller is programmed to operate the heat exchanger in the bypass configuration when the hydrocarbon fuel is utilized and to operate the heat exchanger in the heat exchange configuration when the cryogenic fuel is utilized.

12. The aircraft propulsion system as recited in claim 1, wherein the at least two fuel types comprise a hydrocarbon fuel and a cryogenic fuel and the controller is further programmed to operate the fuel system to provide a select one of the hydrocarbon fuel and the cryogenic fuel based on a predefined flight profile.

13. A bottoming cycle system for an aircraft propulsion system comprising:

a heat exchanger assembly operable in a heat exchanger configuration where an exhaust gas flow is in thermal communication with a working fluid flow and a bypass configuration where the exhaust gas flow passes through the heat exchanger assembly without thermal communication;

a bottoming turbine where a heated working fluid flow from the heat exchanger assembly expands to generate shaft power;

a fuel/working fluid heat exchanger where heat from the working fluid flow is communicated to a cryogenic fuel flow; and a controller programmed to operate the heat exchanger assembly to switch between the heat exchanger configuration and the bypass configuration in response to the cryogenic fuel flow being communicated through the fuel/working fluid heat exchanger.

14. The bottoming cycle system as recited in claim 13, wherein the heat exchanger assembly is annular and comprises a plurality of annular heat exchanger segments separated by a corresponding plurality of annular bypass passages and a flow diverter movable to block exhaust gas flow through the plurality of annular bypass passages in the heat exchanger configuration and to block exhaust gas flow through the plurality of annular heat exchanger segments when in the bypass configuration.

15. The bottoming cycle system as recited in claim 13, wherein the heat exchanger assembly further comprises a mixer assembly movable to define an exit flow through the heat exchanger assembly, the mixer assembly movable between a first position that corresponds with the heat exchanger configuration and a second position that corresponds with the bypass configuration.

16. The bottoming cycle system as recited in claim 15, wherein the mixer assembly comprises a plurality of flaps movable to define an aft flow surface of the heat exchanger assembly in each of the heat exchanger configuration and the bypass configuration.

17. The bottoming cycle system as recited in claim 13, further comprising a bottoming compressor where the working fluid flow is pressurized and a generator driven by the bottoming turbine.

18. A method of operating an aircraft propulsion system comprising:

communicating a fuel flow comprising one of a hydrocarbon based fuel and a cryogenic fuel to a combustor in response to a predefined flight profile;

generating an exhaust gas flow within the combustor of a core engine by igniting a mixture of the fuel flow and an inlet airflow within a combustor;

generating power by expanding the exhaust gas flow through a main turbine section to drive a compressor section and a propulsive fan;

operating a heat exchanger assembly in a heat exchanger configuration where the exhaust gas flow is in thermal communication with a working fluid flow in response to a cryogenic fuel being used to generate the exhaust gas flow; and operating the heat exchanger assembly in a bypass configuration where the exhaust gas flow passes through the heat exchanger assembly without thermal communication with the working fluid flow in response to a hydrocarbon fuel being used to generate the exhaust gas flow.

19. The method as recited in claim 18, further comprising heating a working fluid flow with the exhaust gas flow with the heat exchanger assembly in the heat exchanger configuration and expanding the working fluid through a bottoming turbine to generate shaft power.

20. The method as recited in claim 19, further comprising passing the exhaust gas flow through a plurality of bypass passages when the heat exchange assembly is in the bypass configuration.

* * * * *